(12) United States Patent  (10) Patent No.: US 9,330,249 B2
Sato et al.  (45) Date of Patent: May 3, 2016

(54) INFORMATION TERMINAL

(71) Applicant: PANASONIC CORPORATION, Osaka (JP)

(72) Inventors: Hiroyuki Sato, Kanagawa (JP); Tomohiro Iwama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/203,754

(22) Filed: Mar. 11, 2014

(65) Prior Publication Data
US 2014/0283019 A1 Sep. 18, 2014

(30) Foreign Application Priority Data
Mar. 13, 2013 (JP) ................................. 2013-050923

(51) Int. Cl.
G06F 21/36 (2013.01)
G06F 3/041 (2006.01)

(52) U.S. Cl.
CPC .............. G06F 21/36 (2013.01); G06F 3/0416 (2013.01)

(58) Field of Classification Search
CPC ... G06F 21/36; G06F 3/04516; G06F 3/0416; G06F 3/04883; G06F 3/0488; G06F 3/017
See application file for complete search history.

(56) References Cited

U.S. PATENT DOCUMENTS

| | | | |
|---|---|---|---|
| 9,098,184 B2* | 8/2015 | Akiyama | |
| 2009/0227233 A1 | 9/2009 | Yamashita et al. | |
| 2010/0306718 A1* | 12/2010 | Shim et al. | 715/863 |
| 2010/0321304 A1* | 12/2010 | Rofougaran | 345/173 |
| 2011/0074708 A1* | 3/2011 | Oguri | 345/173 |
| 2011/0199326 A1* | 8/2011 | Takano | 345/173 |
| 2011/0283241 A1* | 11/2011 | Miller et al. | 715/863 |
| 2011/0300831 A1* | 12/2011 | Chin | 455/411 |
| 2012/0188198 A1 | 7/2012 | Jeong et al. | |
| 2012/0200513 A1* | 8/2012 | Kim | G06F 1/1626 345/173 |
| 2012/0289200 A1 | 11/2012 | Yamashita et al. | |
| 2013/0044140 A1* | 2/2013 | Kim | G06F 3/0485 345/684 |
| 2013/0063384 A1* | 3/2013 | Ito | G01C 21/3664 345/173 |
| 2013/0086671 A1* | 4/2013 | Tamaki | 726/16 |

(Continued)

FOREIGN PATENT DOCUMENTS

| | | |
|---|---|---|
| JP | 2006-236143 | 9/2006 |
| JP | 2010-205050 | 9/2010 |

(Continued)

OTHER PUBLICATIONS

Japan Office action in Japan Patent Application No. 2013-050923, mail date is Aug. 12, 2014.

Primary Examiner — Catherine Thiaw
(74) Attorney, Agent, or Firm — Greenblum & Bernstein P.L.C.

(57) ABSTRACT

In an information terminal including a touch panel defining a plurality of touch points for security data entry by selecting and designating the touch points forming a prescribed graphic security pattern, the first touch point is confirmed only when a pointing member has continued to remain within a prescribed region surrounding the touch point for more than a first prescribed time period while the remaining touch points can be confirmed on a less rigorous condition so that the first touch point can be confirmed only when the user intentionally designates the first touch point, and an inadvertent confirmation of an unintended touch point as the first touch point can be effectively avoided.

8 Claims, 12 Drawing Sheets

(56) References Cited

U.S. PATENT DOCUMENTS

| | | | |
|---|---|---|---|
| 2013/0106777 A1* | 5/2013 | Yilmaz | G06F 3/03545 345/174 |
| 2013/0147795 A1* | 6/2013 | Kim | G06F 21/36 345/419 |
| 2013/0150128 A1* | 6/2013 | Tsunoda | 455/566 |
| 2013/0169542 A1* | 7/2013 | Lu et al. | 345/168 |
| 2013/0194223 A1* | 8/2013 | Ward | G06F 1/3262 345/174 |
| 2013/0209058 A1* | 8/2013 | Cho | G06F 3/0488 386/230 |
| 2013/0271393 A1* | 10/2013 | Wang | G06F 3/04883 345/173 |
| 2014/0038558 A1* | 2/2014 | Kim | H04W 12/08 455/411 |
| 2014/0092039 A1* | 4/2014 | Ito | 345/173 |
| 2014/0092069 A1* | 4/2014 | Bentov | G06F 1/26 345/179 |
| 2014/0109024 A1 | 4/2014 | Miyazaki | |
| 2014/0176468 A1* | 6/2014 | Dang | G06F 3/041 345/173 |
| 2014/0289843 A1* | 9/2014 | Chiang | G06F 3/04883 726/19 |

FOREIGN PATENT DOCUMENTS

| | | |
|---|---|---|
| JP | 2012-216128 | 11/2012 |
| JP | 2013-016115 | 1/2013 |
| JP | 2013-025357 | 2/2013 |
| WO | 2007/046466 | 4/2007 |

* cited by examiner

INFORMATION TERMINAL

TECHNICAL FIELD

The present invention relates to an information terminal equipped with a touch panel, and in particular to an information terminal provided with a security lock function that deactivates and locks the touch panel display when the information terminal is not in use to prevent the illicit use of the information terminal by an unauthorized person.

PRIOR ART

Many of the information terminals currently in use are equipped with a touch panel. It is known to incorporate a security lock function to an information terminal to prevent an unauthorized person from accessing the information terminal when the information terminal is lost or stolen. The information terminal is typically provided with a touch sensor on the display panel so that the security lock may be released when the user draws a predetermined pattern on the display panel of the information terminal. See WO2007/046466, for example.

In some of the information terminals now on market, a three by three touch points are defined on the touch panel, and the security lock can be released when a prescribed pattern is drawn by tracing the selected touch points in a single stroke.

A touch panel is highly convenient as it allows data entry to be made in an intuitive manner in association with the letters and graphics displayed on the display panel. However, some of the GUI functions such as focus and preview cannot be implemented with a conventional touch panel. To overcome this problem, it was proposed to detect the presence of a user's finger in the proximity of the touch panel, and enlarge a part of the display which is close to the user's finger.

As an example of technology for contactless data entry, it is known to provide a pair of cameras adjacent to a touch panel displaying a plurality of icons thereon, and detect the position of a user's finger relative to the touch panel so that the icon to which the user's finger is brought close may be enlarged. See JP2006-236143.

The presence of a finger in the proximity of a touch panel can also be detected by providing a plurality of X direction electrodes extending in parallel to one another in the X direction and a plurality of Y direction electrodes extending in parallel to one another in the Y direction on the display panel so as to form an electrostatic capacitor at each intersection. By detecting the changes in the capacitances of these capacitors, the point on the display panel to which a user's finger is brought close can be detected. See JP2010-205050.

It is therefore considered to be convenient in an information terminal provided with a touch panel to allow a security lock to be released by drawing a prescribed pattern (security pattern) with a finger without touching the touch panel, instead of keying a security code typically consisting of a string of numbers.

In this case, a plurality of touch points are to be displayed on the touch panel for the user to connect these touch points with a finger into a prescribed graphic pattern. As this process can be executed without actually touching the touch points, it would be beneficial to the user if the touch points that have been selected are highlighted, and the graphic pattern formed by these points is clearly indicated.

As can be appreciated from the foregoing discussion that each touch point can be selected either by actually touching it or by bringing a finger close to it. In the following description, selecting a touch point by bringing a finger close to it (hover operation) may also be referred to as "touching" as well as by actually touching it (touch operation) for the convenience of description.

Also, because each touch point can be selected without actually touching it (by bringing a finger close to it), there is a high possibility that unintended touch points are inadvertently selected. Such an inadvertent selection of a touch point may be called as an erroneous entry. In case an erroneous entry is made during an entry of a security code in the form of a graphic pattern, the user is required to cancel the entry of the security code altogether, and repeat the process of entering the security code all over again to the annoyance of the user.

According to the technology disclosed in JP2006-236143, when the presence of a finger in the proximity of the touch panel is detected, a corresponding icon is enlarged, but no measure is taken to prevent an erroneous selection or erroneous entry. Because, even when an unintended icon is selected and enlarged, it can be readily rectified by moving the user's finger toward the intended icon, and there is little need to prevent an erroneous selection of an icon.

SUMMARY OF THE INVENTION

In view of such problems of the prior art, a primary object of the present invention is to provide an information terminal that allows a security code to be entered in a contactless manner while minimizing the possibility of an erroneous entry.

A second object of the present invention is to provide an information terminal that allows a security code consisting of a graphic pattern to be entered in a highly convenient manner.

According to the present invention, such objects can be accomplished by providing an information terminal, comprising: a touch panel defining a plurality of touch points for security data entry by selecting and designating the touch points forming a prescribed graphic security pattern; a hover detecting unit for detecting designation of each touch point at least from a hovering of a pointing member adjacent to the corresponding touch point; a hover coordinate determining unit for determining a relative coordinate of the pointing member with respect to the detected touch point; a touch confirming unit for confirming the designation of the touch point according to the corresponding relative coordinate of the pointing member; and a pattern determining unit for releasing a security lock of the information terminal when the security pattern defined by the confirmed touch points matches a lock pattern stored in the information terminal; wherein the touch confirming unit is configured to confirm designation of a first touch point of the security pattern when the relative coordinate thereof has continued to remain within a prescribed region surrounding the touch point for more than a first prescribed time period, and confirm designation of each touch point other than the first touch point of the security pattern when the relative coordinate thereof is within a prescribed region surrounding the touch point.

It was noted by the inventors that an erroneous inadvertent designation of a touch point is most likely to occur in the first touch point. According to the present invention, the first touch point is confirmed only when the pointing member has continued to remain within a prescribed region surrounding the touch point for more than a first prescribed time period so that the first touch point can be confirmed only when the user intentionally designates the first touch point, and an inadvertent confirmation of an unintended touch point as the first touch point can be effectively avoided.

In particular, at least the intervening touch points that are to be designated following the first touch point (possibly with the exception of the last touch point) are confirmed substantially instantaneously or after a time period substantially shorter than the first prescribed time period when the relative coordinate of the pointing member has fallen within the prescribed region surrounding the corresponding touch point. If desired, the last touch point may also be confirmed in a similar fashion, but may also be confirmed on a somewhat more rigorous condition such as a smaller prescribed region or remaining of the relative coordinate in the prescribed region for a certain prescribed time period. In short, according to the present invention, the confirming of the first touch point requires a more rigorous condition than that of the subsequent touch points.

DESCRIPTION OF THE PREFERRED EMBODIMENTS

Figure 1A:
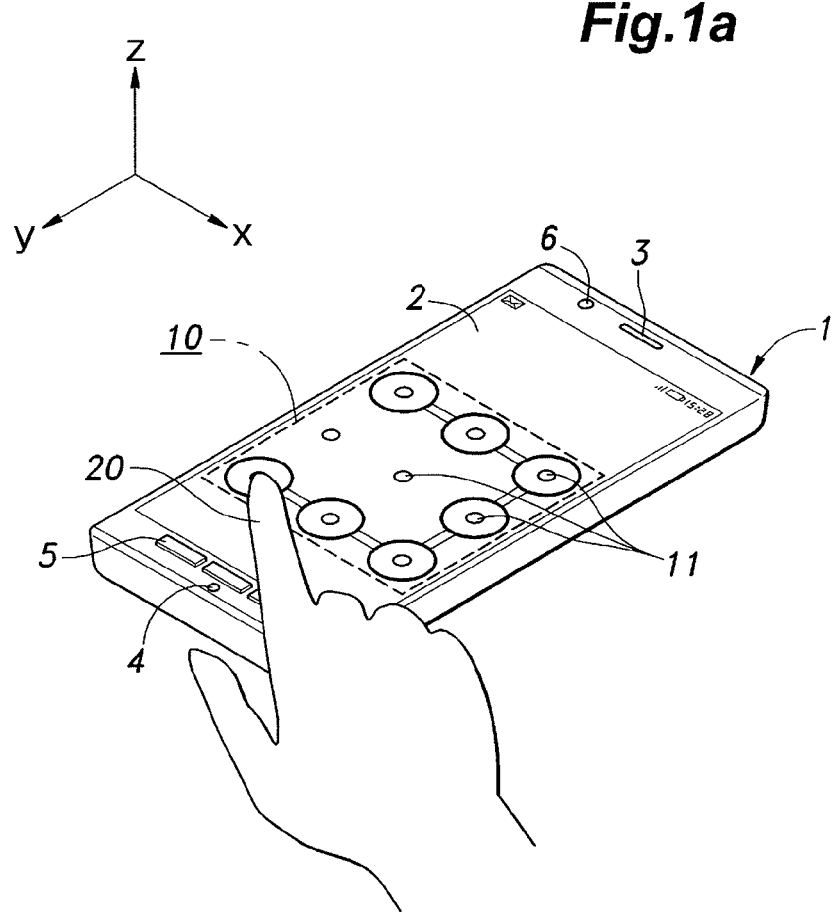
FIG. 1a is an overall perspective view of an information terminal provided with a touch panel embodying the present invention.

According to a certain aspect of the present invention, the prescribed regions for the first and each subsequent touch points are defined in a plane parallel to a surface of the touch panel as a first area and a second area, respectively, the first area being smaller than the second area.

As the first area providing the condition for confirming the first touch point is smaller than the second area providing the condition for confirming a subsequent touch point, the first touch point can be confirmed only when the pointing member such as a finger to be brought substantially close to the corresponding touch point on the x-y plane (parallel to the surface of the touch panel) so that an erroneous confirmation of the first touch point can be effective prevented.

According to another aspect of the present invention, the prescribed regions for the first and each subsequent touch points are defined by perpendicular distances from a surface of the touch panel as a first distance and a second distance, respectively, the first distance being smaller than the second distance.

Therefore, for the confirmation of the first touch point, the pointing member has to be brought close to the touch point in the z direction (perpendicular to the surface of the touch panel) so that an erroneous confirmation of the first touch point can be effective prevented.

According to yet another aspect of the present invention, when the security pattern defined by the confirmed touch points matches a lock pattern stored in the information terminal, the pattern determining unit allows releasing the security lock upon confirming of the last touch point by the touch confirming unit.

In this case, the security lock can be released as soon as the correct security pattern has been entered so that the security lock can be released at the earliest possible moment. Therefore, the user can find the information terminal as highly responsive so that the commercial acceptability of the information terminal can be enhanced.

According to a preferred embodiment of the present invention, when a superfluous touch point is confirmed following confirming of the last touch point, the pattern determining unit prevents releasing of the security lock.

In this case, if a superfluous touch point is confirmed following the last touch point, the security lock is not released, and the user has to try once again to draw the correct security pattern. However, this arrangement makes it harder for any unauthorized third person to discover the required number of touch points to release the security lock and/or to correctly draw the security pattern so that the security of the information terminal can be enhanced.

Preferably, a superfluous touch point is confirmed following confirming of the last touch point on a condition which is more rigorous than that for confirming the last touch point.

Therefore, the chance of the legitimate user inadvertently adding a superfluous touch point following the confirming of the last touch point can be reduced so that the user will find the information terminal easier to use essentially without reducing the level of security.

Preferably, the more rigorous condition comprises a need for the relative coordinate to be closer to the corresponding touch point. The relative coordinate may be closer in the x-y plane to the corresponding touch point and/or closer in the z direction to the corresponding touch point.

Embodiments

Various embodiments of different parts of the present invention are described in the following with reference to the appended drawings.

Figure 1B:
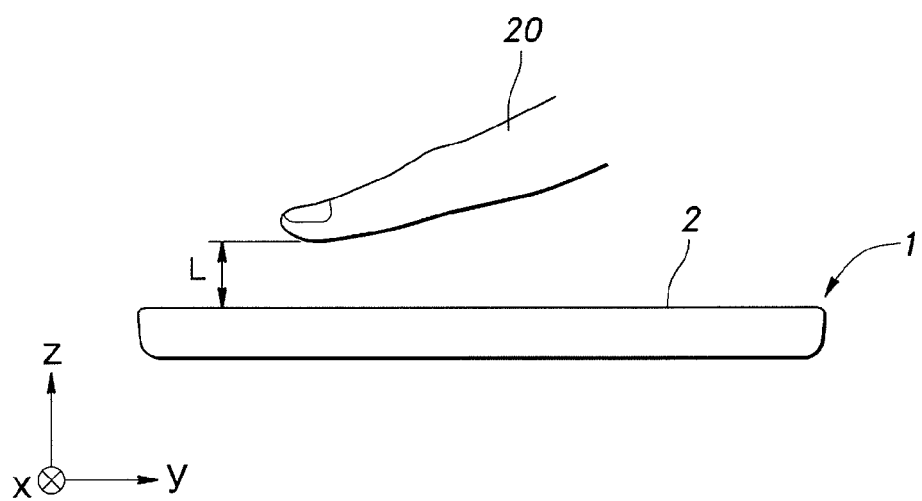
FIG. 1b is a side view showing the relationship between the touch panel and a user's finger (pointing member) when entering data in a contactless manner.

FIG. 1a is an overall perspective view of an information terminal 1 embodying the present invention, and FIG. 1b is a side view showing the positioning of a finger 20 with respect to a touch panel 2 of the information terminal 1 in a contactless data entry.

As shown in FIG. 1, the information terminal 1 includes a speaker 3, a microphone 4, a control panel (keypad) 5 and a camera 6, in addition to the touch panel 2.

The information terminal 1 of the illustrated embodiment essentially consists of a smartphone which provides various functions in addition to those of a mobile phone, and the touch panel 2 serves as a user interface for the information terminal 1. The speaker 3 and the microphone 4 are used when the information terminal 1 is used as a telephone, and the camera 6 can be used for capturing images as still images or movies. The user enters various commands from the touch panel 2 in most part, but some of the commands are entered from the control panel 5 which is provided with physical keys.

The touch panel 2 essentially consists of a display panel such as LCD panel and organic LCD panel, and is provided with a matrix of electrodes laminated on the surface thereof. The electrodes typically consist of fine metallic (copper, for instance) wires or strips or a transparent electrode pattern typically consisting of ITO (indium tin oxide). The electrostatic capacity of each intersecting pair of electrodes is detected such that not only the touching of each particular point by a finger or any other conductive pointed object (pointing member) can be detected but also the coordinate (touch coordinate) at which the touch panel 2 is touched by the finger or the pointing member can be detected. Normally, keys and other marks are displayed on the screen of the touch panel 2 to indicate the role which each touch coordinate on the touch panel 2 is to perform.

The user is enabled to use various functions of the information terminal 1 and access various pieces of information that are stored in the information terminal 1 by entering commands from the touch panel 2.

Furthermore, the information terminal 1 of the illustrated embodiment is configured for a contactless data entry or a hovering operation that produces the same effect as touching the particular point on the touch panel 2 by bringing a finger 20 (or a pointing member) to a prescribed proximity of the particular point on the surface of the touch panel 2 as shown in FIG. 1b. A hovering operation produces a certain change in the capacitance formed between the corresponding pair of intersecting electrodes so that not only the hovering operation is detected but also the coordinate (touch coordinate) at which the hovering operation has taken place can be detected. The hovering operation can be detected when the distance L between the finger 20 and the surface of the touch panel 2 is less than about 20 mm, for instance.

The hovering operation and touching operation are performed by using a finger 20 of the user in the illustrated embodiment, but may also be performed by using a member other than a finger 20 such as a stylus pen (pointing member).

The instructions that can be implemented by a hovering operation include mouseover which allows a prescribed process to be executed simply by placing a cursor on a particular area of a graphic user interface. It is often used for indicating a URL of a hyperlink by moving a cursor to the corresponding area. However, in the following description, the hovering operation is primarily used for entering a graphic pattern on an information terminal for releasing a security lock.

The hovering operation essentially provides the mouseover function to the information terminal 1 equipped with a touch panel 2. According to a certain implementation of the present invention, the hovering operation alone does not complete the releasing of the security lock, but the user is required to touch a touch point on the touch panel 2 after drawing a prescribed graphic pattern by touching or hovering over the corresponding touch points on the touch panel 2. As will be appreciated from the following discussion, the need to actually touch a touch point at the end of drawing a prescribed graphic pattern enhances the convenience of the information terminal.

The touch panel 2 is provided with a pattern input area 10 on which a prescribed graphic pattern is to be drawn in order to release the security lock of the information terminal 1. More specifically, the pattern input area 10 displays nine touch points 11. In the following description, the graphic pattern that is stored in the information terminal 1 will be referred to as "lock pattern", and the graphic pattern that is drawn on the touch panel 2 by the user (typically with the intent to release the security lock) will be referred to as "security pattern".

The information terminal 1 is configured to turn off the display on the touch panel 2 when the information terminal 1 is left unused for a prescribed period of time in order to save power consumption and prevent unauthorized use of the information terminal 1. This condition is sometimes called as screen lock condition or security lock condition. The screen is normally turned off, and the information terminal 1 does not respond to any normal input. However, when any point on the touch panel 2 is touched or any physical key is operated, the touch points are displayed on the touch panel 2. In the security lock condition, and the home screen can be displayed for the information terminal to become useable again only if a user draws a security pattern on the pattern input area 10, and the entered security pattern matches the lock pattern stored in the information terminal 1.

Figure 2A:
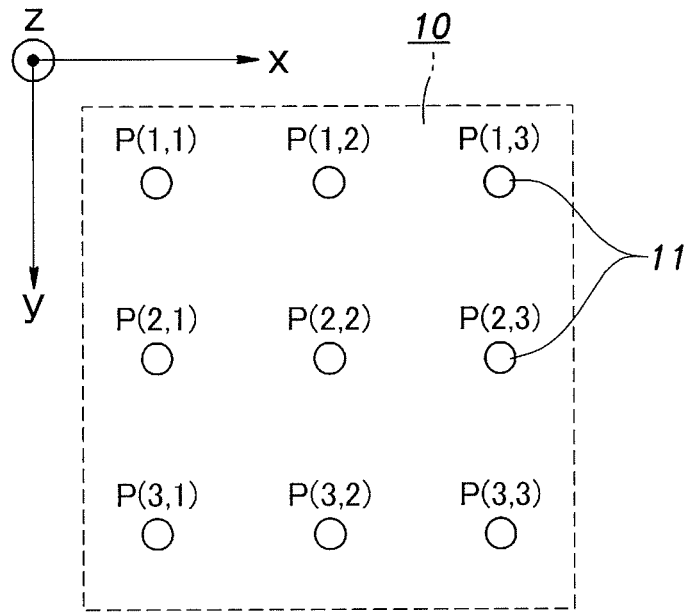
FIG. 2a is a diagram illustrating a 3 by 3 arrangement of touch points on the touch panel.
Figure 2B:
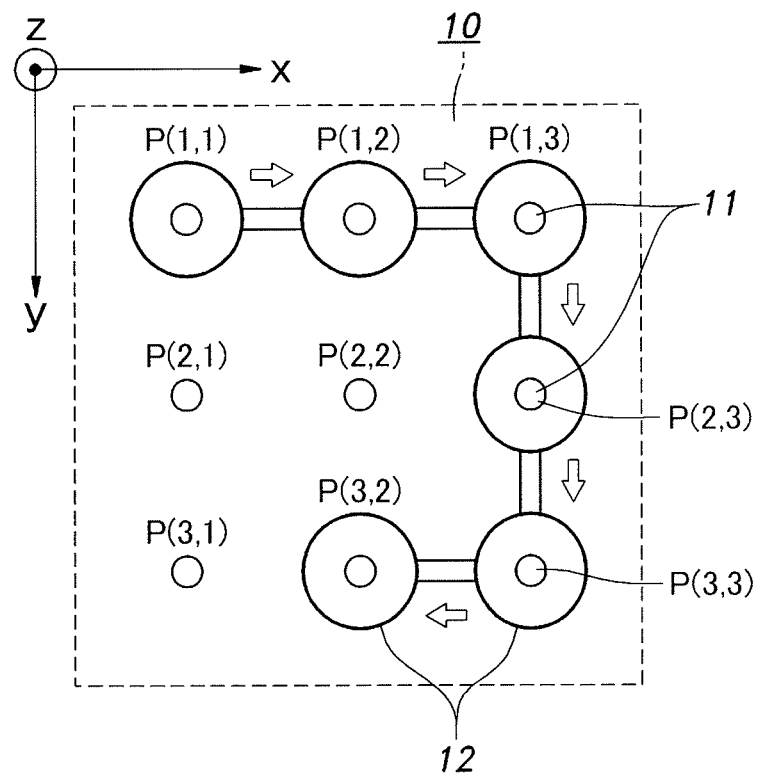
FIG. 2b is a diagram illustrating a mode of entering a security pattern on the touch panel.

FIG. 2a is a diagram illustrating a distribution of touch points 11 on the touch panel 2 in the security lock condition, and FIG. 2b is a diagram illustrating a mode of entering a security pattern on the touch panel. FIGS. 2a and 2b are views of the pattern input area 10 of the touch panel 2 as seen in the z direction (or from above). Referring to FIG. 2a, when the user touches any point on the touch panel 2 (when the screen is turned off) or operates any part of the control panel 5 (see FIG. 1), nine touch points 11 each indicated by a small circle are displayed in a three by three pattern in both the x and y directions. In the following description, the individual touch points 2 are denoted as P(1, 1)-P(3, 3), respectively, for the convenience of description.

How a security pattern may be drawn is discussed in the following. Referring to FIG. 2b, a security pattern consists of a plurality of touch points 11. In the case illustrated in FIG. 2b, a security pattern is formed by the touch points 11 each indicated by a confirmation marker 12 consisting of a larger concentric circle. A security pattern is formed by four or more touch points connected in a single stroke. The two touch points that can be successively connected must be located (a) adjacent to each other either laterally, longitudinally or obliquely, (b) like a move of a knight in the game of chess, or (c) across a touch point that has already by traversed. Except for the case (c), no two touch points 11 may be passed twice.

In the information terminal of the illustrated embodiment, the touch points of a security pattern can be designated or selected by a hovering operation. More specifically, point P (1, 1) can be designated when the user hovers a finger 20 over this point or pass a finger 20 over this point in a contactless manner. Whenever a touch point P is successfully selected, a confirmation marker 12 consisting of a large concentric circle surrounding the corresponding touch point 11 is displayed. In the example illustrated in FIG. 2b, the touch points are designated in the order of P (1, 1), P (1, 2), P (1, 3), P (2, 3), P (3, 3) and P (3, 2) by a user, and the designated touch points are connected by a bold line (confirmation line) on the touch (display) panel 2 while each of the designated touch points is indicated by a confirmation marker 12. The lock pattern can be defined in a similar manner.

Figure 3:
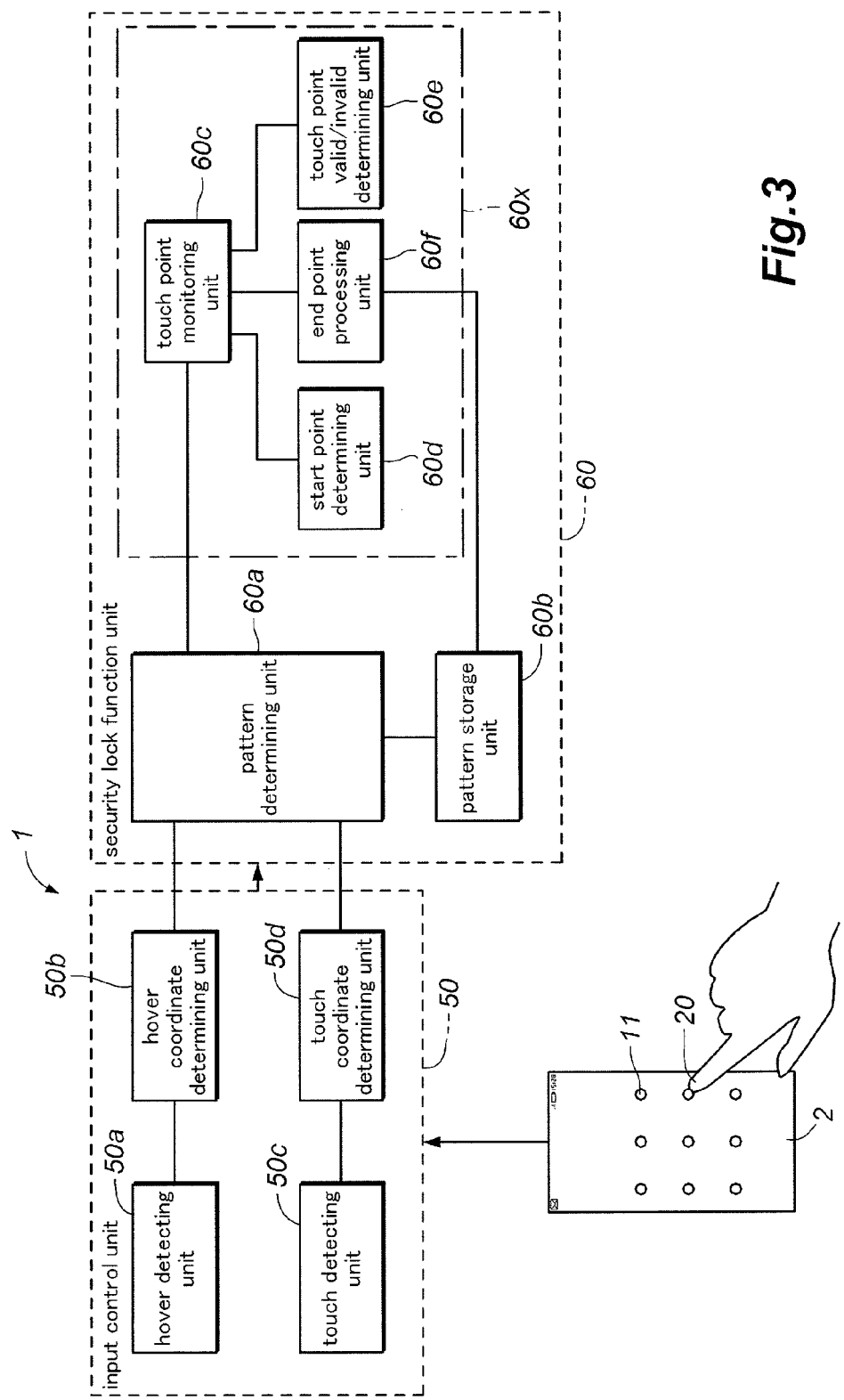
FIG. 3 is a block diagram showing an essential part of the information terminal.

FIG. 3 is a functional block diagram showing an essential part of the information terminal 1. The details of the information terminal 1 are described in the following with reference to FIG. 1a also. FIG. 3 shows only those components of the information terminal 1 that are relevant to the description of the present invention, and the information terminal 1 may also include other components which are not described in the present application.

The information terminal 1 includes an input control unit 50 and a security lock function unit 60 in addition to the touch panel 2.

The input control unit 50 includes a hover detecting unit 50a, a hover coordinate determining unit 50b, a touch detecting unit 50c and a touch coordinate determining unit 50d.

The hardware structure for detecting and distinguishing hover and touch operations and the mode of operation thereof are described in the following. The touch panel 2 is provided with a transparent electrode sheet (not shown in the drawing) overlaid on the screen surface of the display device. A plurality of x direction electrodes (transmission electrodes) extending in the x direction are placed on the front side of the transparent electrode sheet, and a plurality of y direction electrodes (reception electrodes) extending in the y direction are placed on the back side of the transparent electrode sheet in a per se known manner although not shown in the drawings. An electrode driver is provided along the periphery of the electrode sheet. The electrode driver functions as an oscillator and a receiver so that the change in the oscillation wave transmitted from the oscillator can be measured by the receiver.

In the first embodiment, by changing the drive mode for the electrodes by the electrode driver in an alternating manner between those based on mutual capacitance and self capacitance, a touch operation and a hover operation can be distinguished one from the other. In the drive mode based on mutual capacitance, the transmission electrodes and the reception electrodes are individually driven. More specifically, a pulse signal is fed to one of the transmission electrodes, and this signal is retrieved from one of the reception electrodes as electric current, and this process is repeated until the electrostatic capacitances of all of the intersections of the electrodes are directly measured. As a result, even when a plurality of points on the touch panel 2 are touched simultaneously by different fingers 20 (so called multi touch), all of the touch coordinates can be detected. However, the change in the electrostatic capacitance at each intersection of the electrodes is so small that it is not possible to detect a finger 20 which is somewhat spaced away from the screen.

On the other hand, in the drive mode based on self capacitance, the transmission electrodes and the reception electrodes are indiscriminately driven by the oscillator, and the changes in the oscillation wave are measured by the receiver. In the drive mode based on self capacitance, because the change in the electrostatic capacitances of the entire electrodes are detected in such a macroscopic fashion, a finger 20 can be detected even when the finger 20 is significantly spaced from the screen of the touch panel 2, but it is not possible to detect the touching of two points on the touch panel simultaneously by different fingers in an accurate manner. For this reason, in the information terminal 1 of the illustrated embodiment, a touch operation is detected by the mutual capacitance drive mode, and a hover operation is detected by the self capacitance drive mode.

By using the hardware mentioned above, in the initial condition, the hover detecting unit 50a and the hover coordinate determining unit 50b of the input control unit 50 are both activated so that a hover operation may be detected. When the z coordinate detected by the hover coordinate determining unit 50b is close to zero (or a finger 20 has essentially come into contact with the touch panel 2), the input control unit 50 activates the touch detecting unit 50c and the touch coordinate determining unit 50d so that a touch operation may be detected by the mutual capacitance drive mode.

The hover detecting unit 50a detects a finger 20 of a user coming close to the screen of the touch panel 2 (within 20 mm of the screen surface, for instance) within a certain prescribe area around the corresponding touch point 11 in a hover operation. Upon detecting a finger 20 coming close to the screen of the touch panel 2, the hover detecting unit 50a notifies a hover operation event to the hover coordinate determining unit 50b.

Upon receiving the hover operation event from the hover detecting unit 50a, the hover coordinate determining unit 50b computes and produces the hover coordinate Hvf (x1, y1, z1) corresponding to the position of the finger 20 with respect to the screen surface of the touch panel 2. In the hover coordinate Hvf (x1, y1, z1), x1 and y1 indicate the position of the finger 20 on the screen surface of the touch panel 2 (see x and y coordinate in FIG. 2a), and z1 indicates the distance (height) of the finger 20 from the screen surface of the touch panel 2 (see spacing L in FIG. 1b).

As discussed above, the electrostatic capacitance at each of the intersections of the x direction electrodes and the y direction electrodes changes depending on the distance of the finger 20 (considered to be a dielectric member) from the screen surface of the touch panel 2. By measuring the electrostatic capacitances of all of the intersections of the x direction electrodes and the y direction electrodes, the distribution of electrostatic capacitance in the x-y plane can be obtained. More precisely, in the self capacitance drive mode, the change in the electrostatic capacitance is obtained for each of the x direction electrodes and y direction electrodes, but the change in the electrostatic capacitance at each intersection of the x and y electrodes can be obtained only indirectly. A center of gravity of the distribution in the electrostatic capacitance is then obtained as x=x1 and y=y1, and the electrostatic value at this center of gravity is obtained as z=z1 so that the hover coordinate Hvr (x1, y1, z1) can be finally obtained.

The hover coordinate determining unit 50b generates an x-y coordinate value in a hypothetical plane in parallel with the screen surface of the touch panel 2 and a z coordinate value with respect to a direction perpendicular to the screen surface of the touch panel 2 according to the relative position between the screen surface of the touch panel 2 and the finger 20. In the following discussion, the x and y coordinate values of the hover coordinate Hvr (x1, y1, z1) will be referred to as a hover x-y coordinate, and the z coordinate value of the hover coordinate Hvr (x1, y1, z1) will be referred to as hover z coordinate.

The hover coordinate determining unit 50b generates hover area information S1 that indicates the area (hover area) occupied by the electrode intersections used for computing any particular hover coordinate Hvr (x1, y1, z1). This area is defined as an area in which the changes in the electrostatic capacitances are greater than a prescribed threshold range, and the hover area information S1 may consist of the number of the electrode intersections covered by this area. Typically, the further the finger 20 is away from the screen surface of the touch panel 2, the wider the electric flux lines spread, and hence the greater is the hover area. Therefore, it is possible to substitute the z1 coordinate value for the hover area information S1. It is also possible to use both the z1 coordinate value and the hover area information S1 to compute the spacing L shown in FIG. 1b.

The touch detecting unit 50c detects a touch operation or if a user's finger 20 has touched the screen surface of the touch panel 2. In the input control unit 50, as soon as the value of the hover z coordinate value falls below a prescribed value, the operation of the hover detecting unit 50a is suspended (put into sleep), and the touch detecting unit 50c is reactivated. The touch detecting unit 50c then notifies the touch coordinate determining unit 50d of this event.

Upon receiving the notification of this event from the touch detecting unit 50c, the touch coordinate determining unit 50d computes the touch coordinate Tch (x2, y2) of the finger 20 on the screen surface of the touch panel 2. The x2 and y2 values of the touch coordinate Tch (x2, y2) represent the coordinate values of the point at which the finger 20 has come into contact with the screen surface of the touch panel 2.

As discussed earlier, the electrostatic capacitance of each electrode intersection (an intersection of a x direction electrode and a y direction electrode) changes as a finger 20 consisting of a dielectric material touches the screen surface of the touch panel 2. In the case of the mutual capacitance drive mode, because the electrostatic capacitances of all of the electrode intersections can be directly measured, the distribution of electrostatic capacitance in the x-y plane can be obtained. By computing the position of the gravitational center of this distribution, the gravitational center coordinate values x=x2 and y=y2 can be determined, and the touch coordinate Tch (x2, y2) can be obtained. When the user touches the touch panel with two fingers, the touch coordinate for each of the two touch points can be obtained.

The touch coordinate determining unit 50d produces the area that is occupied by the electrode intersections that are used for computing the touch coordinate Tch (x2, y2) as touch area information S2. This area is defined as an area where the electrostatic value has changed by more than a prescribed amount, and the number of such electrode intersections may be produced as the touch area information S2. In the case of multiple touches, the touch area information S2 is generated for each of the touch points.

The input control unit 50 forwards either the combination of the hover coordinate Hvr (x1, y1, z1) and the hover area information S1 or the combination of the touch coordinate (x2, y2) and the touch area information S2 to the security lock function unit 60. Additionally, the input control unit 50 produces a determination flag indicating which combination is forwarded to the security lock function unit 60.

The security lock function unit 60 is described in the following. The security lock function unit 60 includes a pattern determining unit 60a, a pattern storage unit 60b and a touch confirming unit 60x. The touch confirming unit 60x comprises a touch point monitoring unit 60c, a start point determining unit 60d, a touch point valid/invalid determining unit 60e and an end point processing unit 60f. Although not shown in the drawings, the security lock function unit 60 consists various hardware components such as CPU (central processing unit), EEPROM (electrically erasable programmable read only memory) storing control programs and RAM (random access memory) serving as work memory which are connected by a bus or the like, for controlling the overall security lock function of the information terminal 1.

The pattern storage unit 60b stores the lock pattern mentioned above. The lock pattern may be selected by a user from a plurality of choices prepared in the information terminal 1 in advance, or may be created and registered by a user.

The pattern determining unit 60a compares the lock pattern stored in the pattern storage unit 60b with the security pattern that is entered by a user for the purpose of releasing the security lock, and when a match is found, notifies an event of lock release to a corresponding control unit of the information terminal 1 which then starts the drive of the display device forming the touch panel 2 such that a home screen is displayed on the touch panel 2, and the information terminal 1 is put ready for use.

The pattern determining unit 60a inspects the determination flag received from the input control unit 50. If the coordinate and the area information received by the pattern determining unit 60a are those of a hover operation, the pattern determining unit 60a forwards the hover coordinate Hvr (x1, y1, z1) and the hover area information S1 to the touch point monitoring unit 60c which is included in the touch point confirming unit 60x. It is also possible to forward the actual electrostatic value, instead of the hover area information S1 to the touch point monitoring unit 60c to have the touch point monitoring unit 60c compute the hover area information S1.

When the user has performed a hover operation on the touch point 11 shown in FIG. 2a, the touch point confirming unit 60x detects that the touch point 11 has been designated by the particular hover operation, and confirms the designation of this touch point when a prescribed condition is met in the process of designating the particular touch point 11. The confirmation as used herein means a positive determination of the touch point by the touch point confirming unit 60x. The touch point confirming unit 60x then causes a notification of such an event to be produced from the securing lock function unit 60 with the result that a confirmation marker 12 is displayed around the confirmed touch point 11 on the screen of the touch panel 2 as shown in FIG. 2b.

The touch point monitoring unit 60c monitors the overall process of designating a touch point by a user and confirming the touch point, and determines which of the stages of confirming the touch points that form the security pattern required for releasing the security lock the hovering operation by the user has reached. The "stage" as used herein means any of the stage of confirming the first touch point, the stage of confirming the last touch point and the stage of confirming an intervening touch point during the process of entering a security pattern by a user.

The start point determining unit 60d is activated by the touch point monitoring unit 60c when no touch point by a hovering operation has ever been confirmed. In other words, the start point determining unit 60d determines if a designation of a touch point 11 by a user by a hover operation is to be confirmed in the stage of confirming the first touch point.

Upon completion of the stage of confirming the first touch point, the end point processing unit 60f is activated by the touch point monitoring unit 60c. The pattern storage unit 60b stores the lock pattern recorded by the user, the order of drawing the lock pattern (in a single stroke) and the number of touch points that form the lock pattern. The end point processing unit 60f compares the number of touch points that have been entered by the user in drawing the security pattern and confirmed by the system with the number of touch points that form the lock pattern. When the number of the confirmed touch points has reached the stored number of touch points 11, the condition for confirming the touch point 11 is changed. As will be discussed hereinafter, the end point processing unit 60f determines if the designation of a touch point 11 by the user by a hover operation is to be confirmed in the stage of confirming the last touch point 11.

The touch point valid/invalid determining unit 60e is activated by the touch point monitoring unit 60c when the number of confirmed touch point is less than the stored number of touch points or in the stage of confirming an intervening touch point.

The modes of operation of the various embodiments of the present invention are described in the following in the order of the stage of confirming the first touch point, the stage of confirming the last touch point and the stage of confirming an intervening touch point. The steps in the flowcharts are executed by a cooperation between the input control unit 50 and the security lock function unit 60 (in particular, the touch point monitoring unit 60c, the start point determining unit 60d, the end point processing unit 60f and the touch point valid/invalid determining unit 60e of the touch point confirming unit 60x). These control actions are performed by a CPU (not shown in the drawings) forming a central part of the security lock function unit 60.

Figure 10:
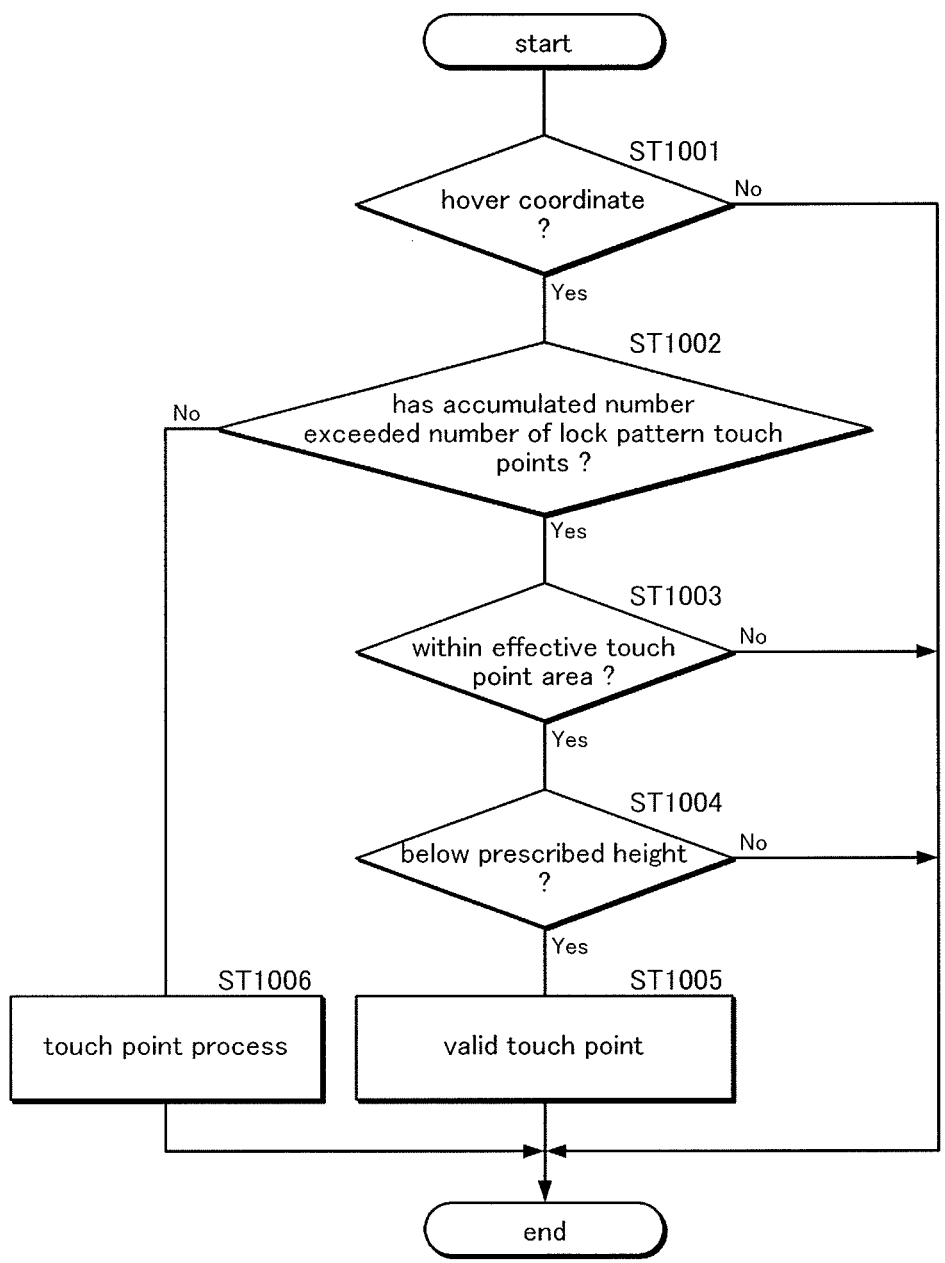
FIG. 10 is a flowchart showing yet another process of preventing an erroneous entry when confirming the selection of a last touch point.
Figure 11:
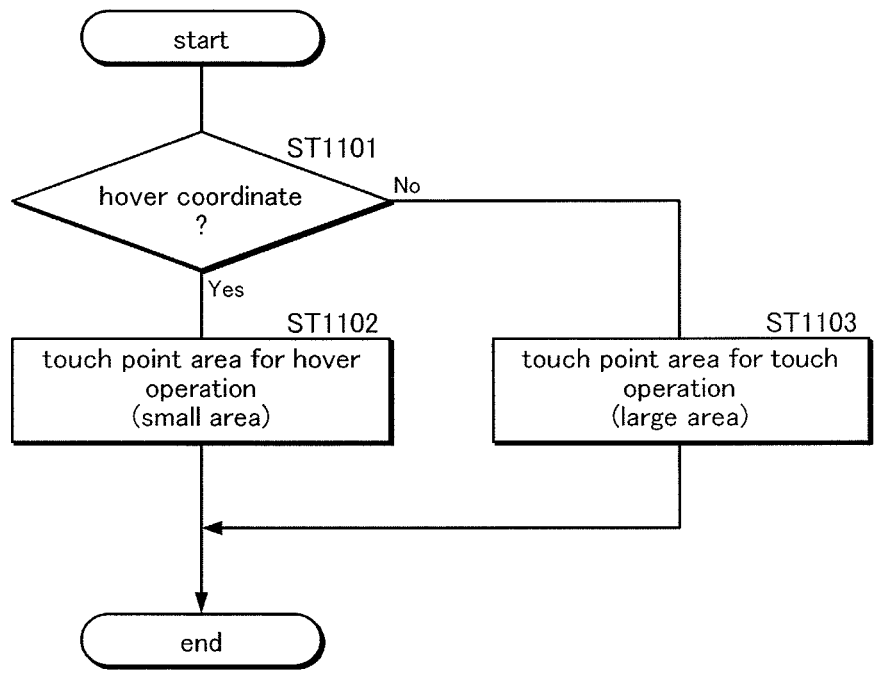
FIG. 11 is a flowchart showing a part of the process of preventing an erroneous entry when confirming the selection of an intervening touch point.
Figure 12:
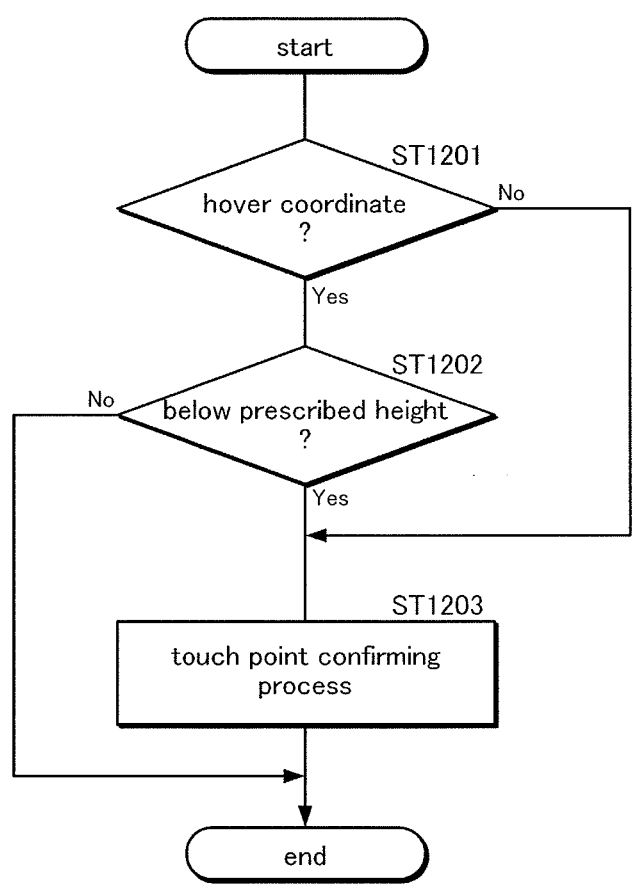
FIG. 12 is a flowchart showing another part of the process of preventing an erroneous entry when confirming the selection of an intervening touch point.

The flowcharts shown in FIGS. 4 to 12 are each executed cyclically at a prescribed interval. In the stage of confirming the first touch point in the illustrated embodiments, the touch point confirming unit 60x performs one of the processes shown in FIGS. 4 to 6, respectively. Upon completion of the stage of confirming the first touch point, one of the processes shown in FIGS. 7 to 10 is performed as the stage of confirming the last touch point. When a certain condition is met in the stage of confirming the last touch point, the process shown in FIG. 12 is performed either by itself or in combination with the process shown in FIG. 11 as the stage of confirming an intervening touch point.

The steps of preventing an erroneous data entry in the stage of confirming the first touch point is described in the following. What is meant by "erroneous data entry" is discussed in the following with reference to FIGS. 2a and 2b.

In a hover operation, a finger 20 is passed along the screen surface of the touch panel 2 while spaced away therefrom. Therefore, when designating the first touch point of the security pattern, it may happen that an unintended touch point 11 is confirmed as the finger 20 is moved along the screen surface of the touch panel 2.

Suppose that the security pattern illustrated in FIG. 2b is to be entered by the user. The first touch point is given as P (1, 1), and the last touch point is given as P (3, 2). Suppose that the finger 20 is passed from the left end of the screen to the right in designating the first touch point by a hover operation. It is then possible that any of the points P (1, 3), P (1, 2) and P (1, 1) is confirmed as the first touch point (erroneous data entry).

Figure 4:
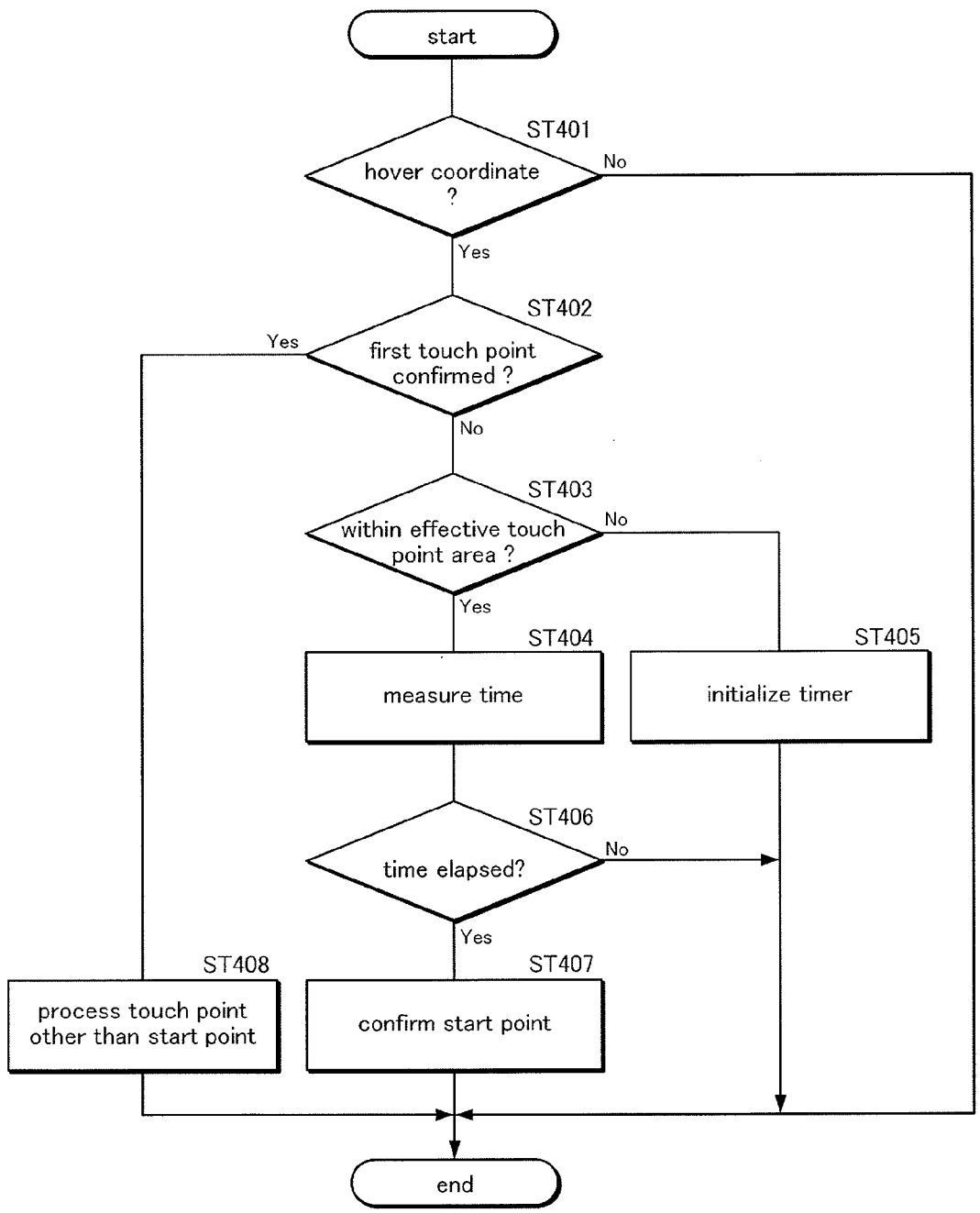
FIG. 4 is a flowchart showing a process of preventing an erroneous entry when confirming the selection of a first touch point.
Figure 5:
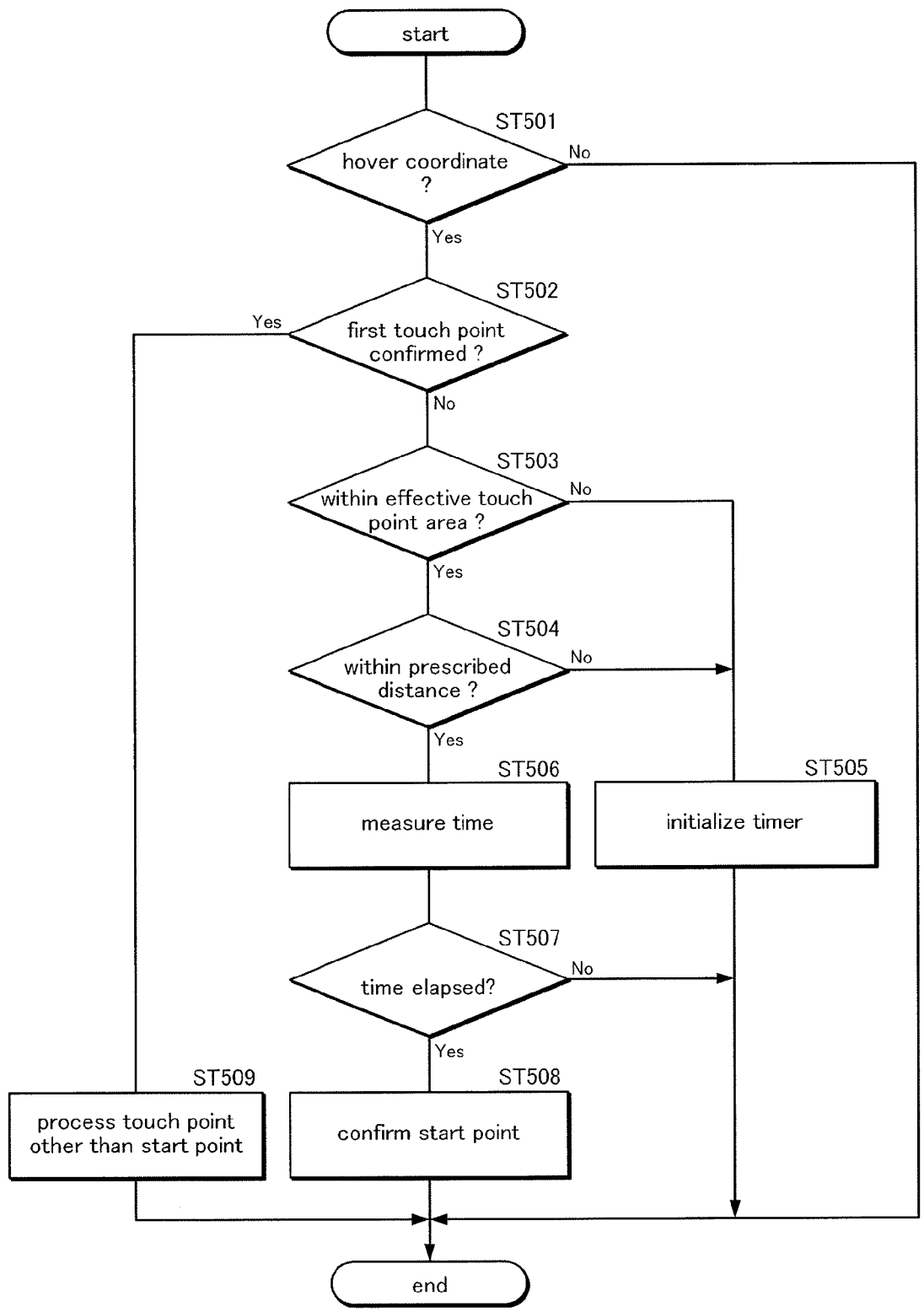
FIG. 5 is a flowchart showing a modified process of preventing an erroneous entry when confirming the selection of a first touch point.
Figure 6:
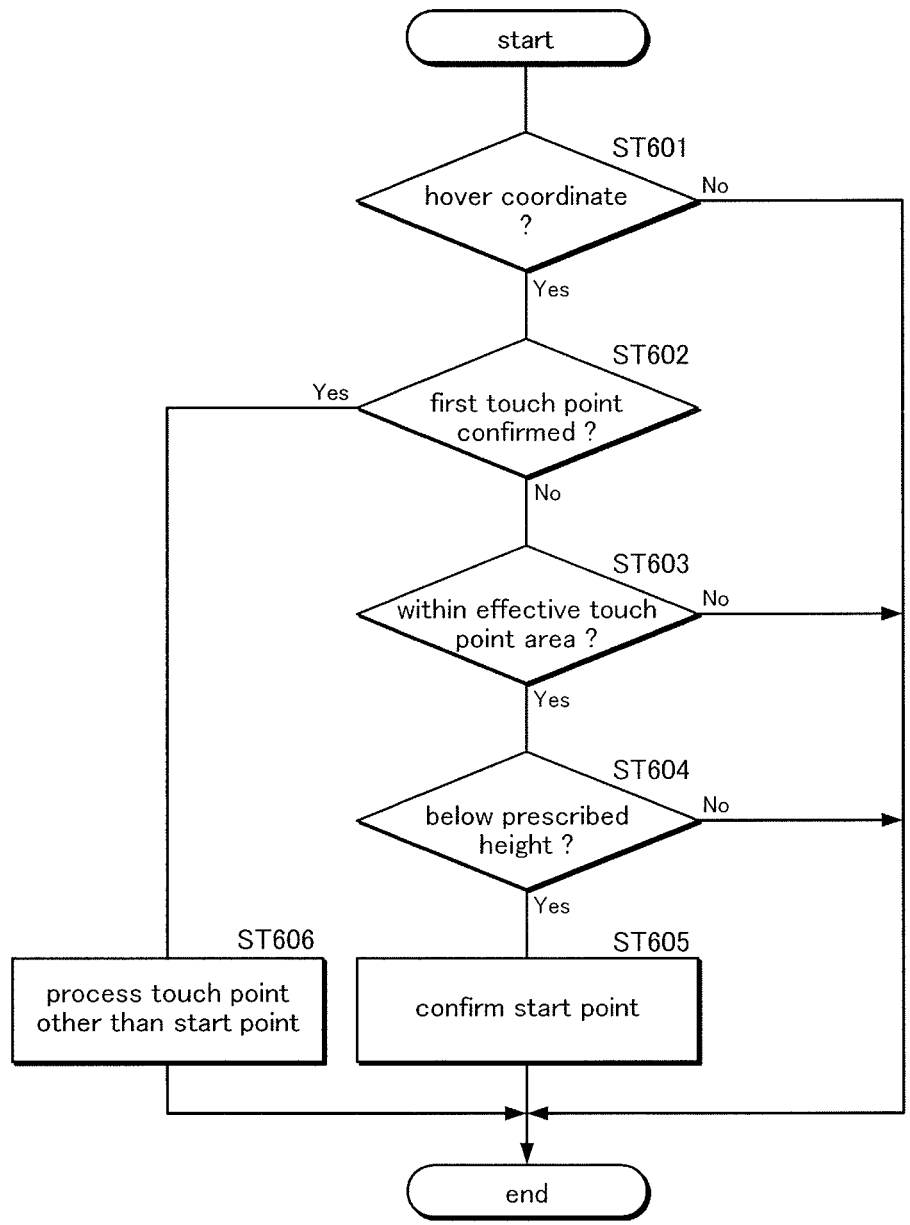
FIG. 6 is a flowchart showing another modified process of preventing an erroneous entry when confirming the selection of a first touch point.

FIGS. 4 to 6 are flow charts showing the processes that are configured to prevent an erroneous data entry during the process of confirming the first touch point. In the following description, reference should be made also to FIGS. 1, 2 and 3 as required.

FIG. 4 shows the process of confirming a first touch point 11 when a hover x-y coordinate is maintained in the effective area of the touch point 11 for more than a prescribed period of time. By referring to the determination flag given by the input control unit 50, the CPU determines if the coordinate which is currently acquired by the security lock function unit 60 is a hover coordinate (ST401). If the coordinate acquired by the security lock function unit 60 is not a hover coordinate (or is a touch coordinate) (No in step ST401), the program flow ends.

If the coordinate acquired by the security lock function unit 60 is a hover coordinate (Yes in step ST401), the CPU determines if the first touch point 11 has already been confirmed (ST402). If the first touch point 11 has already been confirmed (Yes in step ST402), a touch point other than the first touch point 11 is then processed before ending the program flow. In processing a touch point other than the first touch point 11, the stage of confirming an intervening touch point is processed as will be discussed hereinafter. If the first touch point has not yet been confirmed (No in step ST402), the CPU determines if the hover x-y coordinate is within the effective touch point area (ST403).

In the following is described the effective touch point area. FIG. 2b shows the touch points 11 shown as small circles and the confirmation markers 12 which surround those touch points 11 that have been confirmed. Each confirmation marker 12 consists of a circle concentric to the corresponding touch point 11. Each of these areas is fixed in position on the touch panel 2, and the CPU identifies this area with the central coordinate and the associated effective touch point area as an area located within a prescribed first distance (first area) from the central coordinate. In other words, the CPU detects the presence of a hover x-y coordinate within this area when the distance of the hover x-y coordinate from the central coordinate is within the first distance (or the first area). The first distance can be defined as a radius from the central coordinate of the touch point 11 (which may be defined by a circle surrounding the central coordinate) or by the x and y coordinate values with respect to the central coordinate.

When the hover coordinate is within the effective touch point area (Yes in step ST403), the CPU measures time (ST404). The time measured here is the time period for which the hover coordinate has remained within the effective touch point area. More specifically, by using a suitable timer function, step ST404 is cyclically executed (by cyclically executing the program flow shown in FIG. 4) so as to increment a timer in step ST404. The value of the timer corresponds to the time period for which the hover coordinate has remained within the effective touch point area.

If the hover x-y coordinate is not within an effective touch point area (No in step ST403), the CPU initializes the timer or reset the value of the timer to zero (ST405). Upon completion of step ST405, the program flow ends.

In step ST406 following step ST404, the time period measured in step ST404 is evaluated. In other words, the CPU determines if the value of the timer has reached a prescribed value (first prescribed time period) which may be suitably selected within a range of 0.5 to 1 second, for example. If the value of the timer has not reached the prescribed value (or the first prescribed time period has not elapsed) (No in step ST406), the program flow ends.

If the value of the timer has reached the prescribed value in step ST406 (Yes in step ST406), the CPU confirms the start point of the security pattern (ST407). In other words, the touch point 11 designated by the user by a hover operation is confirmed as the first touch point 11, and the corresponding confirmation marker 12 is displayed. Upon completion of step ST407, the program flow ends.

FIG. 5 shows another process of confirming a touch point 11 when a hover coordinate is maintained within the prescribed distance from the center of the touch point 11 for more than the prescribed time period. The CPU determines if the coordinate currently acquired by the security lock function unit 60 is a hover coordinate by referring to the determination flag (ST501). If the coordinate currently acquired by the security lock function unit 60 is a touch coordinate (No in step ST501), the program flow ends.

If the coordinate currently acquired by the security lock function unit 60 is a hover coordinate (Yes in step ST501), the CPU determines if the first touch point 11 has already been confirmed (ST502). If the first touch point 11 has indeed been already confirmed (Yes in step ST502), the processing of another touch point different from the first touch point is executed (ST509) before ending the program flow. If the first touch point 11 has not yet been confirmed (No in step ST502), the CPU determines if the hover x-y coordinate is within the effective touch point area (see the processing in step ST403)

(ST503). If the hover x-y coordinate is not within the effective touch point area (No in step ST503), the program flow advances to step ST505.

If the hover x-y coordinate is within the effective touch point area (Yes in step ST503), the CPU determines if the hover x-y coordinate is within a second prescribed distance from the center of the touch point 11 (ST504), the second prescribed distance being smaller than the first prescribed distance. The second prescribed distance may be substituted by a second prescribed area (which is smaller than the first prescribed area). The second prescribed area may be defined by a circle concentric to the center of the touch point 11 and having a radius smaller than that of the confirmation marker 12, but may also be defined by any other geometric shape.

If the hover x-y coordinate is not within the second prescribed distance from the center of the touch point 11 (No in step ST504), the program flow advances to step ST505. If the hover x-y coordinate is within the second prescribed distance from the center of the touch point 11 (Yes in step ST504), the CPU starts measuring time by using a timer. (ST506; see ST404 for details of time measurement). More specifically, step ST506 is cyclically repeated by using a clock function of the CPU, and the timer is incremented at step ST506. The value on the timer indicates the time period for which the hover coordinate has remained not only within the effective touch point area but also within the second prescribed distance.

If the hover x-y coordinate is not within the effective touch point area (No in step ST503) or is not within the second prescribed distance (No in step ST504), the CPU initializes the clock or resets the value of the timer to zero (ST505). Upon completion of step ST505, the program flow ends.

The CPU then determines if the prescribed time period has elapsed (ST507), or determines if the value of the timer has reached a prescribed value. The prescribed value (first prescribed time period) may be determined as required, for instance from a range of 0.5 to 1 second. When the prescribed time period has not elapsed (No in step ST507), the program ends.

Following step ST506, if the CPU determines that the prescribed time period has elapsed (Yes step ST507), the CPU confirms the start point of the security pattern (ST508). In other words, the touch point 11 designated by the hover operation by the user is confirmed as the first touch point, and it is indicated by the displaying of the confirmation marker. Upon completion of step ST508, the program flow ends.

FIG. 6 shows that when the hover z coordinate has fallen below a prescribed value within the effective touch point area (or the finger has been brought below a prescribed height from the screen surface of the touch panel 2), this touch point 11 is confirmed as the first touch point. By referring to the determination flag, the CPU determines if the coordinate currently acquired by the security lock function unit 60 is a hover coordinate (ST601). If the coordinate currently acquired by the security lock function unit 60 is a touch coordinate, instead of a hover coordinate (No in step ST601), the program flow ends.

If the coordinate currently acquired by the security lock function unit 60 is indeed a hover coordinate (Yes in step ST601), the CPU determines if the first touch point has already been confirmed (Yes in step ST602). If the first touch point 11 has already been confirmed (Yes in step ST602), the processing of a touch point other than the first touch point is executed (ST606), and the program flow ends. On the other hand, if the first touch point has not yet been confirmed (No in step ST602), the CPU determines if the hover x-y coordinate is within the effective touch point area (refer to the processing in step ST403) (ST603). If the hover x-y coordinate is not within the effective touch point area (No in step ST603), the program flow ends.

If the hover x-y coordinate is within the effective touch point area (Yes in step ST603), it is then determined if the hover z coordinate is below a prescribed height (ST604). The z coordinate is defined as the height of the user's finger 20 from the screen surface of the touch panel 2 (spacing L in the z direction; see FIG. 1*b*), and the prescribed height is defined below the height (such as 20 mm) that allows a hover operation. If the hover z coordinate is greater (higher) than the prescribed height (No in step ST604), the program flow ends.

If the hover z coordinate is smaller (lower) than the prescribed height (Yes in step ST604), the CPU confirms the start point of the security pattern (ST605). In other words, the touch point 11 designated by the user via the hover operation is confirmed, and the confirmation marker 12 is displayed. Upon completion of step ST605, the program flow ends.

As discussed above, by performing the processes described above with reference to FIGS. 4 to 6, an unintended touch point 11 is effectively prevented from being erroneously entered before the intended first touch point.

The processes for preventing an erroneous data entry in the stage of confirming the last touch point is described in the following. First of all, what is meant by an erroneous data entry in the stage of confirming the last touch point is explained in the following with reference to FIG. 2*b*.

Suppose that the security pattern that is to be designated by the user is as shown in FIG. 2*b*. This security pattern is drawn from the first touch point consisting of P (1, 1) to the last touch point P (3, 2) in the order indicated by the arrows. Following the confirming of the lastly designated touch point or point P (3, 2), if the user straightens his finger which was initially bent by the flexing of the finger around the first and second finger joints following the confirmation of the last touch point, not only the z coordinate value z1 of the hover coordinate Hvr (x1, y1, z1) but also the x and y coordinate values thereof may change so that that point P (2, 2) could be erroneously confirmed (erroneous entry) as the last touch point.

FIGS. 7 to 10 show the flowcharts of the processes for preventing an erroneous entry in the stage of confirming the last touch point. In the following description, reference should be made also to FIGS. 1, 2 and 3 as required. In the stage of confirming the last touch point, if the number of touch points that have been designated in drawing the security pattern should exceed the number of touch points required to draw the lock pattern, the condition for confirming the touch point is changed (in particular, is made more rigorous so that the touch point may not be so readily confirmed).

As discussed above, the lock pattern information including the number of touch points that are required to draw the lock pattern is recorded in the pattern storage unit 60*b* of the security lock function unit 60 by the user for increasing the security of the information terminal 1. Therefore, every time a touch point designated by the user is confirmed, the number of touch points that have been confirmed is updated so as to obtain an accumulated number of touch points (the number of touch points that have been confirmed during the process of drawing the security pattern), and the accumulated number of touch point is compared with the number of touch points required for drawing the lock pattern.

Figure 7:
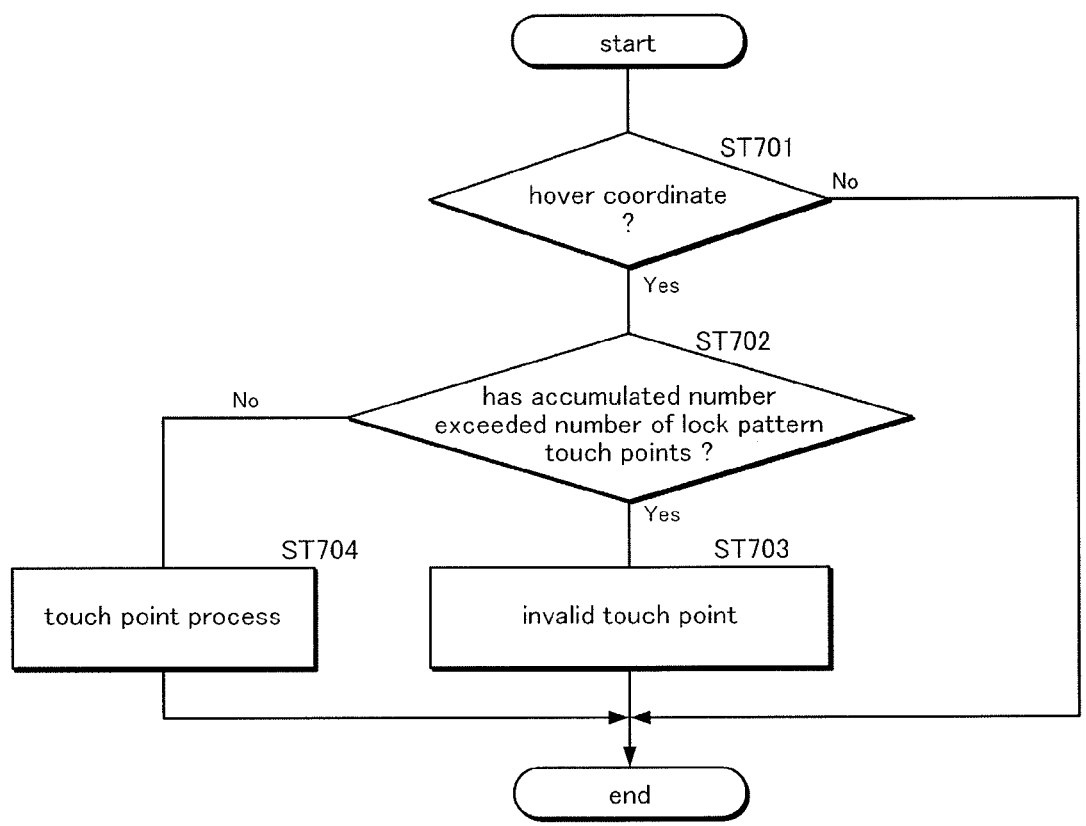
FIG. 7 is a flowchart showing a process of preventing an erroneous entry when confirming the selection of a last touch point.

FIG. 7 shows the process of invalidating a new touch point when the accumulated number of touch points has reached the number of touch points required for drawing the lock pattern.

First of all, by referring to the determination flag produced by the input control unit 50, the CPU determines if the coordinate currently acquired by the security lock function unit 60 is a hover coordinate (ST701). If the coordinate acquired by the security lock function unit 60 is a touch coordinate (No in step ST701), the program flow ends.

If the coordinate acquired by the security lock function unit 60 is a hover coordinate (Yes in step ST701), the CPU determines if the accumulated number of touch point has exceeded the number of lock pattern touch points (ST702). If the accumulated number of touch point has not exceeded the number of lock pattern touch points (No in step ST702), a touch point process is executed (ST704), and the program flow ends. The touch point process in this case consists of the process for the stage of confirming an intervening touch point which will be described hereinafter.

If the accumulated number of touch point has exceeded the number of lock pattern touch points (Yes in step ST702), no more touch point is confirmed as a valid touch point. Instead, the superfluous touch point currently designated by the user is determined to be invalid, and the touch point confirmed previous to the currently designated touch point is maintained as the last touch point (ST703). However, the confirmation of the superfluous touch point may be treated as an event for causing the pattern determining unit 60a to release the security lock so that the need for pressing a confirmation key may be eliminated. Alternatively, the pattern determining unit 60a may be configured to release the security lock as soon as the pattern determining unit 60a detects a match between the drawn security pattern and the lock pattern without requiring a confirmation key.

Figure 8:
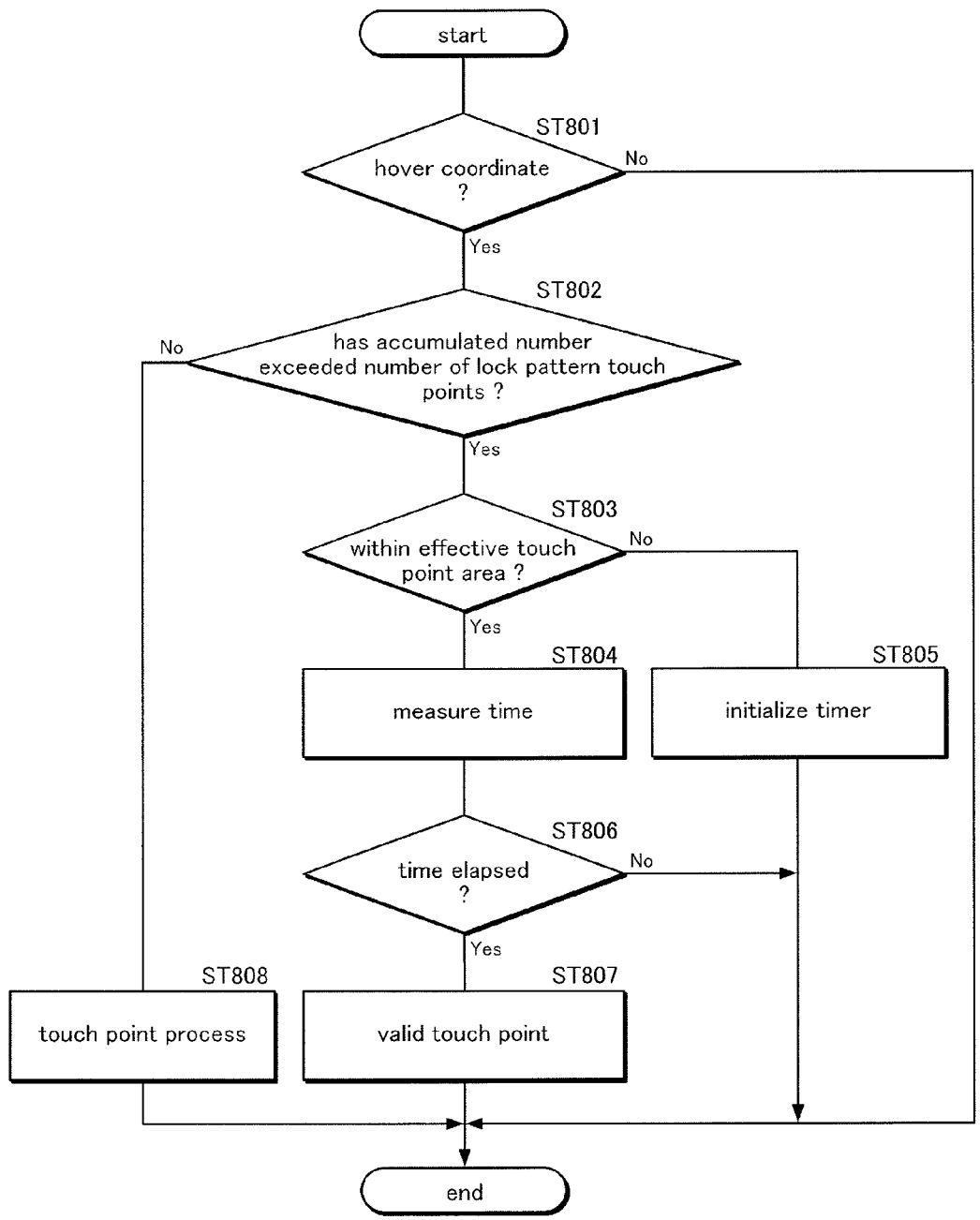
FIG. 8 is a flowchart showing a modified process of preventing an erroneous entry when confirming the selection of a last touch point.

FIG. 8 shows the process of confirming a superfluous touch point after the confirmation of the last touch point. When such a superfluous touch point is confirmed, the pattern determining unit 60a determines a failure of match between the drawing security pattern and the lock pattern.

First of all, by referring to the determination flag produced by the input control unit 50, the CPU determines if the coordinate currently acquired by the security lock function unit 60 is a hover coordinate (ST801). If the coordinate currently acquired by the security lock function unit 60 is a touch coordinate (No in step ST801), the program flow ends.

If the coordinate currently acquired by the security lock function unit 60 is a hover coordinate (Yes in step ST801), the CPU compares the accumulated number of touch points with the number of the lock pattern touch points (ST802). If the accumulated number of touch points has not exceeded the number of the lock pattern touch points (No in step ST802), a touch point process is executed (ST808), and the program flow ends. For details of the touch point process, refer to the process of ST704).

If the accumulated number of touch points has exceeded the number of the lock pattern touch points (Yes in step ST802), the CPU determines if the hover x-y coordinate is within the effective touch point area (ST803). For details of the effective touch point area, refer to the process of step ST403. If the hover x-y coordinate is within the effective touch point area (Yes in step ST803), the CPU measures time (ST804). For details of measuring time, refer to the process of step ST404.

If the hover x-y coordinate is not within the effective touch point area (No in step ST803), the CPU initializes the measurement of time (ST805), and upon completion of step ST805, the program flow ends. For details of initializing the measurement of time, refer to the process of step ST405.

Following step ST804, the CPU determines if the prescribed time period has elapsed (ST806). For details of the step of determining the elapsing of the prescribed time period, refer to step ST405. Upon elapsing of the prescribed time period or detecting that the hover x-y coordinate has remained in the effective touch point area for more than the prescribed time period (Yes in step ST806), the touch point currently designated by the user is determined to be valid so that this touch point is confirmed as a superfluous touch point following the last touch point (ST807). In this case, the pattern determining unit 60a does not release the security lock, and the user has to repeat the process of entering the security pattern anew. If the superfluous touch point is not detected, and the user presses a confirmation key, the pattern determining unit 60a determines a match between the drawn security pattern and the lock pattern, and releases the security lock. The confirmation key may consist of a virtual key defined on the touch panel or a physical key, and the touch panel may be configured such that the confirmation by the user can be made simply by touching any part of the touch panel 2.

Figure 9:
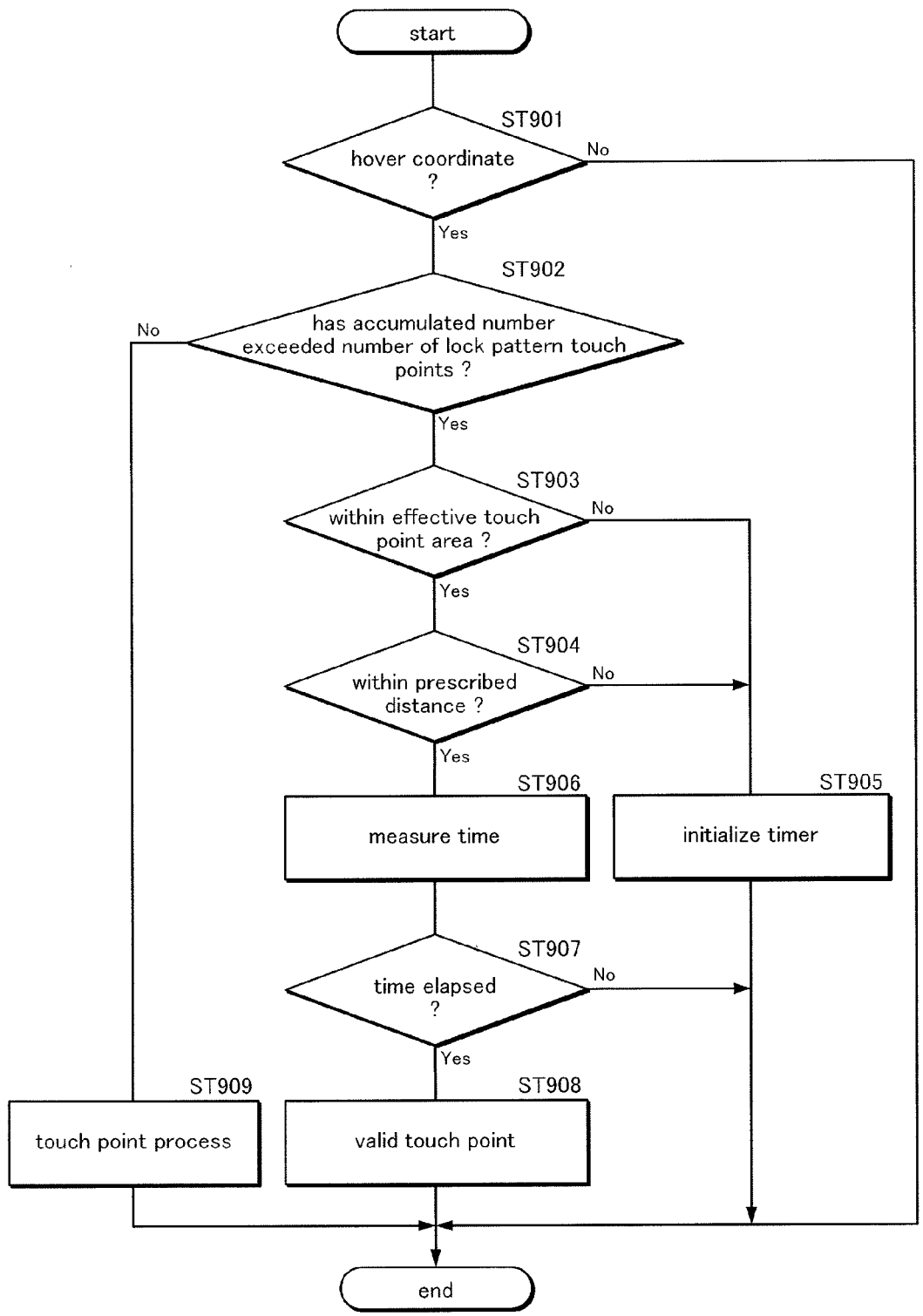
FIG. 9 is a flowchart showing another modified process of preventing an erroneous entry when confirming the selection of a last touch point.

FIG. 9 shows the process of confirming a superfluous touch point after the confirmation of the last touch point. When such a superfluous touch point is confirmed, the pattern determining unit 60a determines a failure of match between the drawn security pattern and the lock pattern. This embodiment different from that shown in FIG. 8 in that the condition for confirming the superfluous touch point is more rigorous.

First of all, by referring to the determination flag produced by the input control unit 50, the CPU determines if the coordinate currently acquired by the security lock function unit 60 is a hover coordinate (ST901). If the coordinate currently acquired by the security lock function unit 60 is a touch coordinate (No in step ST901), the program flow ends.

If the coordinate currently acquired by the security lock function unit 60 is indeed a hover coordinate (Yes in step ST901), the CPU determines if the accumulated number of touch points has exceeded the number of touch points of the lock pattern (ST902). If the accumulated number of touch points has not exceeded the number of touch points of the lock pattern (No in step ST902), a touch point process is executed (ST909), and the program flow ends. The touch point process in this case consists of the process for the stage of confirming an intervening touch point which will be described hereinafter. For details of the touch point process, refer to the process of step ST704.

If the accumulated number of touch points has exceeded the number of the lock pattern touch points (Yes in step ST902), the CPU determines if the hover x-y coordinate is within the effective touch point area (ST903). For details of the effective touch point area, refer to the process of step ST403. If the hover x-y coordinate is not within the effective touch point area (No in step ST903), the CPU initializes the measurement of time (ST905), and upon completion of step S905, the program flow ends. For details of initializing the measurement of time, refer to the process of step ST405.

If the hover x-y coordinate is within the effective touch point area (Yes in step ST903), the CPU determines if the hover x-y coordinate is within a prescribed distance defining an even narrower area than the effective touch point area (ST904). For details of the prescribed distance, refer to the process of step ST504.

If the hover x-y coordinate is not within the prescribed distance (No in step ST904), the program flow advances to step ST905 mentioned above. On the other hand, if the hover x-y coordinate is within the within the prescribed distance (Yes in step ST904), the CPU measures the elapsed time (ST906). For details of the measurement of time, refer to the process of step ST405. The measured time corresponds to the time period for which the hover x-y coordinate has remained within the effective touch point area and within the prescribed distance.

The CPU then determines if the prescribed time period has elapsed (ST906). For details of the step of determining the elapsing of the prescribed time period, refer to step ST405. If the prescribed time period has not elapsed (No in step ST907), the program flow ends. If the prescribed time period has elapsed (Yes in step ST907), the touch point 11 currently designated by the user is confirmed as a superfluous touch point following the last touch point (ST908). In this case also, the pattern determining unit 60a does not release the security lock, and the user has to repeat the process of entering the security pattern anew.

If the superfluous touch point is not detected, and the user presses a confirmation key, the pattern determining unit 60a determines a match between the drawn security pattern and the lock pattern, and releases the security lock. The confirmation key may consist of a virtual key defined on the touch panel or a physical key, and the touch panel may be configured such that the confirmation by the user can be made simply by touching any part of the touch panel 2.

FIG. 10 shows the process of confirming a superfluous touch point after the confirmation of the last touch point. When such a superfluous touch point is confirmed, the pattern determining unit 60a determines a failure of match between the drawn security pattern and the lock pattern. This embodiment different from that shown in FIG. 8 in that the condition for confirming the superfluous touch point is more rigorous.

First of all, by referring to the determination flag produced by the input control unit 50, the CPU determines if the coordinate currently acquired by the security lock function unit 60 is a hover coordinate (ST1001). If the coordinate currently acquired by the security lock function unit 60 is a touch coordinate (No in step ST1001), the program flow ends.

If the coordinate currently acquired by the security lock function unit 60 is indeed a hover coordinate (Yes in step ST1001), the CPU determines if the accumulated number of touch point has exceeded the number of touch points of the lock pattern (ST1002). If the accumulated number of touch points has not exceeded the number of touch points of the lock pattern (No in step ST1002), a touch point process is executed (ST1006), and the program flow ends. For details of the touch point process, refer to the process of ST704).

If the accumulated number of touch points has exceeded the number of the lock pattern touch points (Yes in step ST1002), the CPU determines if the hover x-y coordinate is within the effective touch point area (ST1003). For details of the effective touch point area, refer to the process of step ST403. If the hover x-y coordinate is not within the effective touch point area (No in step ST1003), the program flow ends.

If the hover x-y coordinate is within the effective touch point area (Yes in step ST1003), the CPU determines if the hover z coordinate is within the prescribed height (ST1004). For details of the prescribed height, refer to the process of step ST604.

If the hover z coordinate is within the prescribed height (Yes in step ST1004), the touch point currently designated by the user is valid so that this touch point is confirmed as a superfluous touch point following the last touch point (ST1005). In this case also, the pattern determining unit 60a does not release the security lock, and the user has to repeat the process of entering the security pattern anew. If the superfluous touch point is not detected, and the user presses a confirmation key, the pattern determining unit 60a determines a match between the drawn security pattern and the lock pattern, and releases the security lock. The confirmation key may consist of a virtual key defined on the touch panel or a physical key, and the touch panel may be configured such that the confirmation by the user can be made simply by touching any part of the touch panel 2.

As discussed above, according to the process shown in FIG. 7, entering or confirming a superfluous touch point following the last touch point does not prevent a successful releasing of the security lock whereas according to the process shown in FIG. 8, confirming a superfluous touch point following the last touch point prevents a successful releasing of the security lock. According to the processes shown in FIGS. 9 and 10, the condition for confirming a superfluous touch point is made more rigorous than that of the process shown in FIG. 8 so that the chance of confirming an inadvertently selected superfluous touch point following the confirming of the last touch point can be minimized, and the information terminal 1 may be easier to use for the legitimate user.

In the processes shown in FIGS. 8, 9 and 10, when the accumulated number of touch points has exceeded the number of touch points of the lock pattern, the superfluous touch points are not immediately determined to be invalid. If the superfluous touch points are immediately determined to be invalid, there is a possibility that a third person may illicitly learn the number of touch points of the lock pattern. By applying additional conditions in the processes shown in FIGS. 9 and 10 as discussed above, the possibility of confirming the inadvertent selection of superfluous touch points following the completion of drawing the correct security pattern can be minimized while the possibility of allowing a third person to illicitly learn the number of touch points of the lock pattern can be eliminated at the same time.

As discussed above, the pattern storage unit 60b (see FIG. 3) stores not only the number of touch points of the lock pattern but also the route for drawing the lock pattern (the order of connecting the touch points 11). Therefore, the CPU is able to verify the agreement between the security pattern and the lock pattern at each step of drawing the security pattern before the security pattern is finally drawn.

In the description referring to FIGS. 8 to 10, the touch point confirming unit 60x changed the condition for confirming a touch point when the accumulated number of touch points has exceeded the number of touch points of the lock pattern. It is also possible to determine the agreement between the security pattern and the lock pattern at each step of drawing the security pattern, and change the condition for confirming a touch point only when the agreement between the security pattern and the lock pattern was finally verified.

Once the order of drawing the lock pattern is known, the route length can be readily computed. For instance, the distance between two touch points adjoining either in the lateral or longitudinal direction may be defined as 1.0. Based on such a consideration, the condition for confirming a touch point may be changed when the route lengths of the security pattern and the lock pattern have come to agree with each other.

The process of preventing an erroneous data entry in the stage of confirming an intervening touch point is described in the following. What is meant by an erroneous data entry in the stage of confirming an intervening touch point is explained in the following with reference to FIGS. 2a and 2b.

Supposed that the security pattern that is to be drawn by the user includes a segment connecting touch points P (1, 1) and P (3, 2) (the move of a knight in the game of chess). When drawing this segment, an unintended touch point such as P (2, 1) or P (2, 2) could be inadvertently confirmed. Also, when the user intends to designate touch point P (1, 1) by a hover operation, it is possible that the system erroneously confirms an adjacent touch point such as touch point P (1, 2). Thus, a hover operation is inherently more prone to erroneous data entry as compared to a touch operation.

FIGS. 11 and 12 are flowcharts showing the process of preventing an erroneous data entry in the stage of confirming an intervening touch point. In the following description, reference should be made also to FIGS. 1, 2 and 3 as required.

FIG. 11 shows the process of reducing the effective touch point area further in a hover operation than in a touch operation.

First of all, by referring to the determination flag given by the input control unit 50, the CPU determines if the coordinate which is currently acquired by the security lock function unit 60 is a hover coordinate (ST1101). If the coordinate acquired by the security lock function unit 60 is not a hover coordinate (or is a touch coordinate) (No in step ST1101), a relatively large area is assigned to the effective touch point area for a touch operation (ST1103). If the coordinate acquired by the security lock function unit 60 is a hover coordinate (Yes in step ST1101), a relatively small area is assigned to the effective touch point area for a hover operation (ST1102). In other words, the effective touch point area for a hover operation is smaller than the effective touch point area for a touch operation.

As the effective touch point area for a hover operation was already discussed earlier, the effective touch point area for a touch operation is now discussed in the following. The touch point 11 and the confirmation marker 12 are concentric circular marks that are displayed on the screen surface of the touch panel 2, and are fixed in position, the central coordinate being known to the CPU. When a touch coordinate Tch (x2, y2) is within a third distance (third area) from the center coordinate of these circles, the CPU determines that the touch point is within the effective touch point area.

The third distance may be given as a radius as measured from the center of the touch point 11, but may also be given by a x-y coordinate in relation with the central coordinate. In the illustrated embodiments, the effective touch point area for a hover operation (first distance or first area) was smaller than the effective touch point area for a touch operation (third distance or third area). For instance, the effective touch point area for a touch operation may coincide with the confirmation marker 12, and the effective touch point area for a hover operation may be intermediate between the touch point 11 and the confirmation marker 12.

When the effective touch point area is defined depending on the particular mode of the touch point operation in this manner, as the effective touch point area for a hover operation is relatively small, an erroneous data entry owing to the passing of a finger between two adjoining unintended touch points 11 can be avoided.

FIG. 12 shows the process of confirming a touch point 11 when a hover z coordinate has fallen below a prescribed height in a hover operation.

First of all, by referring to the determination flag given by the input control unit 50, the CPU determines if the coordinate which is currently acquired by the security lock function unit 60 is a hover coordinate (ST1201). If the coordinate acquired by the security lock function unit 60 is not a hover coordinate (or is a touch coordinate) (No in step ST1201), the program flow advances to step ST1203.

If the coordinate acquired by the security lock function unit 60 is a hover coordinate (Yes in step ST1201), the CPU determines if the z coordinate is below the prescribed height (ST1202). For details of the prescribed height, refer to the process of step ST604. If the z coordinate is above the prescribed height (No in step ST1202), the program flow ends.

If the z coordinate is below the prescribed height (Yes in step ST1202), the process of confirming the touch point is performed (ST1203). The process of confirming the touch point consists of treating (confirming) the touch point 11 designated by the user as a point forming the security pattern, and upon confirmation of the touch point 11, the confirmation marker 12 is displayed over the corresponding touch point 11 (see FIG. 2b). Prior to confirming this touch point 11, if there is any already confirmed preceding touch point, the CPU displays the connection between the newly confirmed touch point and the preceding confirmed touch point by using a connection marker (confirmation line). The connection marker may also be displayed as soon as the touch point to be confirmed is designated (although the touch point to be confirmed may not be confirmed yet).

As discussed above, the smaller the hover z coordinate is (or the smaller the distance between the finger 20 and the touch panel 2 is), the smaller the value indicated by the hover area information S1 becomes. It means that the hover x-y coordinate is detected by the electrode intersections of a smaller area as the hover z coordinate gets smaller. In other words, the smaller the hover z coordinate is, the higher the position detecting precision in detecting the hover x-y coordinate becomes. In the flowchart shown in FIG. 12, as the touch point can be confirmed from a highly reliable position information, an erroneous confirmation of an adjoining touch point 11 can be effectively prevented.

The present invention has been described in terms of specific embodiments, but they were given only as examples, and do not restrict the present invention. For instance, in the foregoing embodiments, the designation of each touch point was in most part required to be made exclusively via a hover operation, but the input control unit 50 and the security lock function unit 60 may be configured such that a touch operation may be used instead of a hover operation in some cases.

The touch confirming unit 60x comprised (in addition to a touch point monitoring unit 60c) a start point determining unit 60d, a touch point valid/invalid determining unit 60e and an end point processing unit 60f in the illustrated embodiment, but is not required to comprise all of these units, and may comprise only a part of these components. For instance, the touch confirming unit 60x may comprise only a touch point monitoring unit 60c and a start point determining unit 60d, a touch point monitoring unit 60c and an end point processing unit 60f, or a touch point monitoring unit 60c and a touch point valid/invalid determining unit 60e. Furthermore, the touch confirming unit 60x may comprise only two of a start point determining unit 60d, a touch point valid/invalid determining unit 60e and an end point processing unit 60f, in addition to a touch point monitoring unit 60c.

The embodiments described above were directed to the process of entering a security pattern in the form of a graphic pattern for the purpose of releasing a security lock. However, the same structures and processes are equally applicable when recording a lock pattern in the system as an object to be compared with the security pattern.

In the foregoing embodiments, each touch point forming a security pattern was confirmed, and the security pattern and the lock pattern were compared in a subsequent operation. However, if the last touch point is to be confirmed as a result of a touch operation, it is possible to have the CPU determine if the security lock should be released upon completion of this touch operation.

The information terminal 1 consisted of a smartphone in the first embodiment, but may also consist of any information terminal such as a tablet. The information terminal 1 is not required to be portable, but may also consist of a desktop PC having a display configured as a touch panel or a desktop or any other PC provided with a touch panel data input device.

The various component used in the foregoing embodiments are not wholly essential, but some of them may be omitted and/or substituted without departing from the spirit of the present invention. Although the present invention has been described in terms of preferred embodiments thereof, it is obvious to a person skilled in the art that various alterations and modifications are possible without departing from the scope of the present invention which is set forth in the appended claims.

The information terminal of the present invention can prevent an erroneous data entry when designating a security pattern with a hover operation, and enhance the convenience of the information terminal. The present invention is applicable to all sorts of information terminals such as smartphones, tablets, desktop computers and laptop computers.

The contents of the original Japanese patent application on which the Paris Convention priority claim is made for the present application as well as the contents of the prior art references mentioned in this application are incorporated in this application by reference.

The invention claimed is:

1. An information terminal for reducing touch point reading errors and releasing a security lock of the information terminal, comprising:
    a touch panel that displays a plurality of touch points;
    a coordinate determining unit, implemented by a hardware processor, that determines a coordinate corresponding to a position of a pointing member along a direction perpendicular to the touch panel;
    a touch confirming unit, implemented by a hardware processor, that confirms that a first touch point of the plurality of touch points in a security lock release procedure is designated by the pointing member according to the determined coordinate, and adds the confirmed first touch point to an input pattern;
    a pattern determining unit, implemented by a hardware processor, that determines whether the input pattern matches a lock pattern stored in the information terminal,
    wherein, the touch confirming unit confirms that the first touch point is designated, when the first touch point has remained within a first prescribed region surrounding the first touch point for more than a first prescribed time period,
    after the first touch point has been added to the input pattern and before the input pattern matches the lock pattern, the touch confirming unit confirms that at least one subsequent touch point is designated, when the determined coordinate has remained within a second prescribed region surrounding the at least one subsequent touch point for more than a second prescribed time period, the second prescribed time period being shorter than the first prescribed time period; and
    the security lock of the information terminal is released when the first touch point and subsequent touch points matching the lock pattern have been designated on the touch panel.

2. The information terminal according to claim 1, wherein the first and second prescribed regions are defined by areas in a plane parallel to a surface of the touch panel, and the area of the first prescribed region is smaller than the area of the second prescribed region.

3. The information terminal according to claim 1, wherein the first and second prescribed regions are defined by distances perpendicular to a surface of the touch panel, and the distance of the first prescribed region is smaller than the distance of the second prescribed region.

4. The information terminal according to claim 1, wherein, when the input pattern matches the lock pattern, the pattern determining unit allows release of the security lock, regardless of the coordinate determined by the coordinate determining unit after the input pattern matches the lock pattern.

5. The information terminal according to claim 1, wherein, when it is confirmed that a touch point is designated after the input pattern matches the lock pattern, the pattern determining unit prevents release of the security lock.

6. The information terminal according to claim 1, wherein, after the input pattern matches the lock pattern, the touch confirming unit sets a third prescribed region surrounding a touch point, which is smaller than the second prescribed region, and confirms that the touch point is designated when the determined coordinate is within the third prescribed region.

7. The information terminal according to claim 1, wherein the second prescribed time period is 0.

8. A security lock releasing method for reducing touch point reading errors and releasing a security lock of an information terminal, comprising:
    displaying a plurality of touch points on a touch panel;
    determining a coordinate corresponding to a position of a pointing member, along a direction perpendicular to the touch panel;
    confirming that a first touch point of the plurality of touch points is designated by the pointing member, according to the determined coordinate, adding the first touch point to an input pattern, when the first touch point is confirmed to be designated; and
    determining whether the input pattern matches a lock pattern stored in the information terminal,
    wherein, in the confirming,
        it is confirmed that the first touch point is designated, when the determined coordinate has remained within a prescribed region surrounding the touch point for more than a first prescribed time period, and
        after the first touch point has been added in the input pattern and before the input pattern matches the lock pattern, it is confirmed that at least one subsequent touch point is designated, when the determined coordinate has remained within a prescribed region surrounding the at least one subsequent touch point for more than a second prescribed time period, the second prescribed time period being shorter than the first prescribed time period, and
    releasing the security lock of the information terminal when the first point and subsequent touch points matching the lock pattern have been designated on the touch panel.

* * * * *